United States Patent
Paltanavicius et al.

(10) Patent No.: US 11,210,345 B2
(45) Date of Patent: *Dec. 28, 2021

(54) USING DISTRIBUTED STATE MACHINES FOR HUMAN-TO-COMPUTER DIALOGS WITH AUTOMATED ASSISTANTS TO PROTECT PRIVATE DATA

(71) Applicant: Google LLC, Mountain View, CA (US)

(72) Inventors: Adomas Paltanavicius, London (GB); Andrea Ambu, London (GB)

(73) Assignee: GOOGLE LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/910,526

(22) Filed: Jun. 24, 2020

(65) Prior Publication Data

US 2020/0320136 A1 Oct. 8, 2020

Related U.S. Application Data

(63) Continuation of application No. 15/813,281, filed on Nov. 15, 2017, now Pat. No. 10,713,300.

(Continued)

(51) Int. Cl.
*G06F 7/04* (2006.01)
*G06F 16/9032* (2019.01)
(Continued)

(52) U.S. Cl.
CPC ........ *G06F 16/90332* (2019.01); *G06F 9/451* (2018.02); *G06F 16/243* (2019.01);
(Continued)

(58) Field of Classification Search
CPC ............. G06F 16/243; G06F 16/90332; G06F 21/6245; G06F 9/451; G06F 17/2785;
(Continued)

(56) References Cited

U.S. PATENT DOCUMENTS

| | | | |
|---|---|---|---|
| 8,250,192 B2 * | 8/2012 | Bowerman | G06F 15/173 709/223 |
| 10,417,567 B1 * | 9/2019 | Miller | G06N 3/006 |

(Continued)

FOREIGN PATENT DOCUMENTS

| | | |
|---|---|---|
| JP | 2005099944 | 4/2005 |
| KR | 1020060052631 | 5/2006 |
| WO | 2011088053 | 7/2011 |

OTHER PUBLICATIONS

European Patent Office; Intention To Grant for Application No. 18807159.1 dated May 19, 2020. 37 Pages.

(Continued)

*Primary Examiner* — Gary S Gracia
(74) *Attorney, Agent, or Firm* — Middleton Reutlinger (57) ABSTRACT

Techniques are described related to for generating/distributing state machines that are implemented within a security zone to obtain private information from one or more resources within the security zone. In various implementations, an automated assistant client implemented by processor(s) within the security zone may receive a free form natural language query ("FFNLQ") that is answerable using private information available from resource(s) within the security zone. Data indicative of the FFNLQ may be provided to a semantic processor outside of the security zone, and the online semantic processor may return a state machine that is implemented by processor(s) within the security zone to obtain the private information from resource(s) within the security zone. Based on the state machine and the obtained private information, natural language output may be generated and presented to convey information responsive to the FFNLQ.

20 Claims, 5 Drawing Sheets

Related U.S. Application Data (60) Provisional application No. 62/581,528, filed on Nov. 3, 2017.

(51) Int. Cl.

| | | |
|---|---|---|
| *G06F 40/30* | (2020.01) | |
| *G06F 9/451* | (2018.01) | |
| *G06F 16/242* | (2019.01) | |
| *G06F 21/62* | (2013.01) | |
| *G10L 15/08* | (2006.01) | |
| *H04L 29/06* | (2006.01) | |
| *H04W 4/021* | (2018.01) | |
| *H04N 7/16* | (2011.01) | |

(52) U.S. Cl.
CPC .......... *G06F 21/6245* (2013.01); *G06F 40/30* (2020.01); *G10L 15/08* (2013.01); *H04L 63/0272* (2013.01); *H04W 4/021* (2013.01)

(58) Field of Classification Search
CPC ..... G06F 40/30; H04L 63/0272; G10L 15/08; H04W 4/021
See application file for complete search history.

(56) References Cited

U.S. PATENT DOCUMENTS

| | | | | |
|---|---|---|---|---|
| 10,867,067 | B2* | 12/2020 | Griffin | G06N 20/00 |
| 2002/0198719 | A1* | 12/2002 | Gergic | G06F 9/451 |
| | | | | 704/270.1 |
| 2012/0265531 | A1* | 10/2012 | Bennett | G10L 15/18 |
| | | | | 704/254 |
| 2013/0152092 | A1* | 6/2013 | Yadgar | G10L 15/22 |
| | | | | 718/102 |
| 2013/0185074 | A1* | 7/2013 | Gruber | G10L 15/1815 |
| | | | | 704/257 |
| 2014/0074454 | A1* | 3/2014 | Brown | G06F 3/167 |
| | | | | 704/9 |
| 2014/0244712 | A1* | 8/2014 | Walters | G06F 3/167 |
| | | | | 709/202 |
| 2015/0185996 | A1* | 7/2015 | Brown | G06F 3/04842 |
| | | | | 715/706 |
| 2015/0213355 | A1* | 7/2015 | Sharma | G06F 3/167 |
| | | | | 706/11 |
| 2016/0094492 | A1* | 3/2016 | Li | H04L 51/02 |
| | | | | 709/206 |
| 2016/0173578 | A1* | 6/2016 | Sharma | H04L 51/02 |
| | | | | 709/203 |
| 2017/0024431 | A1* | 1/2017 | Dayan | G06F 16/3344 |
| 2017/0091612 | A1* | 3/2017 | Gruber | G06F 40/169 |
| 2017/0092278 | A1* | 3/2017 | Evermann | G10L 15/22 |
| 2018/0061400 | A1* | 3/2018 | Carbune | G06F 16/3331 |

OTHER PUBLICATIONS

European Patent Office; International Search Report and Written Opinion of PCT Ser. No. PCT/US2018/058152; 14 pages; dated Feb. 11, 2019.
Korean Intellectual Property Office; Notice of Office Action issued in Application No. 10-2020-7015091; 12 pages; dated May 26, 2021.
European Patent Office; Communication issue for Application No. 20198903.5; 7 pages; dated Nov. 10, 2020.
European Patent Office; Intention to Grant issue for Application No. 20198903.5; 39 pages; dated Oct. 27, 2021.

* cited by examiner

```
<code>
    value1 = fetch(metric=INSTALLS, from=2017-04-01, to=2017-04-30)
    value2 = fetch(metric=INSTALLS, from=2017-05-01, to=2017-05-30)
    if value2 > value1:
        return "Yes. You had $value2 in May and $value1 in April, which is " + percentage((value2-value1) / value1) "% more";
    else:
        return "Sadly no."
</code>
```

RECEIVE, AT AN AUTOMATED ASSISTANT CLIENT IMPLEMENTED BY ONE OR MORE PROCESSORS WITHIN A SECURITY ZONE, A FREE-FORM NATURAL LANGUAGE QUERY FROM A USER, WHEREIN THE FREE-FORM NATURAL LANGUAGE QUERY IS ANSWERABLE BASED ON PRIVATE INFORMATION THAT IS AVAILABLE FROM ONE OR MORE RESOURCES WITHIN THE SECURITY ZONE
402

↓

PROVIDE FIRST DATA INDICATIVE OF THE FREE-FORM NATURAL LANGUAGE INPUT TO A SEMANTIC PROCESSOR, WHEREIN THE SEMANTIC PROCESSOR IS OUTSIDE OF THE SECURITY ZONE
404

↓

RECEIVE, BY ONE OR MORE OF THE PROCESSORS WITHIN THE SECURITY ZONE, FROM THE ONLINE SEMANTIC PROCESSOR, SECOND DATA INDICATIVE OF A STATE MACHINE, WHEREIN THE STATE MACHINE IS IMPLEMENTABLE TO OBTAIN THE PRIVATE INFORMATION FROM ONE OR MORE OF THE RESOURCES WITHIN THE SECURITY ZONE
406

↓

IMPLEMENT, BY ONE OR MORE OF THE PROCESSORS WITHIN THE SECURITY ZONE, THE STATE MACHINE TO OBTAIN THE PRIVATE INFORMATION FROM ONE OR MORE OF THE RESOURCES WITHIN THE SECURITY ZONE
408

↓

GENERATE, BASED ON THE STATE MACHINE AND THE OBTAINED PRIVATE INFORMATION, NATURAL LANGUAGE OUTPUT THAT CONVEYS INFORMATION RESPONSIVE TO THE FREE-FORM NATURAL LANGUAGE QUERY
410

↓

PROVIDE, BY THE AUTOMATED ASSISTANT CLIENT, AT ONE OR MORE OUTPUT COMPONENTS, THE NATURAL LANGUAGE OUTPUT
412

Fig. 5

USING DISTRIBUTED STATE MACHINES FOR HUMAN-TO-COMPUTER DIALOGS WITH AUTOMATED ASSISTANTS TO PROTECT PRIVATE DATA

BACKGROUND

Humans may engage in human-to-computer dialogs with interactive software applications referred to herein as "automated assistants" (also referred to as "chatbots," "interactive personal assistants," "intelligent personal assistants," "personal voice assistants," "conversational agents," etc.). For example, humans (which when they interact with automated assistants may be referred to as "users") may provide commands, queries, and/or requests (collectively referred to herein as "queries") using free form natural language input which may be vocal utterances converted into text and then processed, and/or by typed free form natural language input.

In many cases, logical instances of automated assistants may be implemented across multiple computing devices. For example, a logical instance of an automated assistant may include an automated assistant client installed on a user's mobile phone and one or more cloud-based automated assistant components. The automated assistant client may be configured to provide the user with an automated assistant interface that the user can operate to engage in a human-to-computer dialog with the automated assistant. However, much of the heavy lifting associated with the human-to-computer dialogs is often performed by the cloud-based automated assistant components, which are able to leverage the virtually limitless resources of the cloud to perform semantic processing of natural language queries.

Users may engage in human-to-computer dialogs with automated assistants for a variety of reasons, such as searching for information, performing tasks, etc. Sometimes when users interact with automated assistants, the users may seek information that is sensitive or private, or that depends on information that is sensitive or private. This potentially sensitive or private information may be stored on one or more computing devices operated by the user and/or on the cloud in association with a user profile of the user. While it is possible to grant cloud-based automated assistant components access to such user-controlled resources, doing so may potentially expose the private or sensitive information to third parties that the user would not wish to have access to the information. And in some scenarios, the user may not want even the cloud-based automated assistant components to have access to sensitive or private information. Moreover, cloud-based automated assistant components may not have access to some information that is stored, for instance, at resources (e.g., computing devices) that are within protected "security zones," such as corporate networks that are behind one or more firewalls.

SUMMARY

Techniques are described herein for generating and/or distributing state machines that are executable within a security zone, e.g., by automated assistant clients operating on computing device(s) within the security zone, to obtain private information from one or more resources within the security zone. In various implementations, a user may provide a free form natural language query to an automated assistant interface provided by an automated assistant client executing on a client device the user operates (e.g., stand-alone interactive speaker, smart phone, etc.). The query may be answerable based on private information that is available at one or more resources within a security zone, and not available to cloud-based automated assistant components.

In some implementations, the security zone may coincide with one or more networks, such as one or more local area networks ("LAN") and/or one or more corporate networks, to which the user's client device is connected and/or which are protected by one or more firewalls. In other implementations, the security zone may coincide with one or more client devices of a coordinated "ecosystem" of client devices operated by the user, e.g., in association with a user profile of the user. In general, a "security zone" may refer to one or more computing resources that include data that is not generally accessible outside of the security zone.

Rather than providing a semantic processor outside of the security zone with access to this private information, which may pose security risks and/or make users uncomfortable, in various implementations, the semantic processor outside of the security zone may be provided with data indicative of the free form natural language query, without any private data filled in. Based on the data indicative of the query, the semantic processor may generate and/or select one or more state machines, e.g., from a library of preexisting state machines, that are implementable by one or more computing devices within the security zone. These state machines may include, for instance, slots that are to be filled with values taken from private information that is only available by way of resources within the security zone. In some implementations, the state machines may include logic (e.g., states and transitions between states, if/else statements, etc.) that is implementable by one or more computing devices within the security zone to fill the state machine slots with values. For example, in some implementations, the state machines may be implemented by an automated assistant client executing on a computing device within the security zone.

In some implementations, the state machines may be generated (e.g., in the cloud) on the fly, e.g., in response to specific free form natural language queries. Additionally or alternatively, in some implementations, the state machines may be selected from a library of preexisting state machines. For example, if a user asks, "Do I have diabetes," that query may be mapped to one or more state machines that include slots for data points associated with (i.e. that evidence) diabetes (e.g., glucose levels, H1C levels, BMI, etc.). The state machine may be provided to a component within the security zone of the requesting user and implemented by that component to obtain one or more of these slot values, either from computing resources within the security zone or from the user (e.g., by prompting the user for the information). The state machine may include logic (e.g., if/then statement (s), etc.) that causes output such as "Yes, you likely have diabetes," or "No, you appear healthy" to be provided depending on what values are gathered and used to fill the slots.

Techniques described herein give rise to a number of technical advantages. General purpose online semantic processors—which may include cloud-based automated assistant components—may be highly capable of semantically processing a wide variety of free form natural language queries, given the virtually limitless resources of the cloud they have at their disposal. These cloud-based resources may include, for instance, resources (e.g., databases) related to various domains. With such robust resources, an online semantic processor (or another component) may be able to select and/or generate relatively complex state machines that may be implemented within security zones. Thus, it is possible to leverage relatively robust online semantic processors to generate state machines that can then be implemented by relatively resource-constrained components such as automated assistant clients operating on resource-constrained client devices.

For example, suppose a user asks an automated assistant whether the user has a particular health condition. An online semantic processor may be able to select and/or generate a state machine that is designed to obtain, as slot values, a variety of data points (e.g., health parameters, symptoms, etc.) that can be used to determine whether the user has the health condition. This state machine may then be transmitted to and implemented by one or more components within the user's security zone, such as an automated assistant client operating on the user's client device, to obtain the data. In this example, the slot values may be obtained, for instance, from memory of the user's client device (e.g., if the client device has vital signs sensors, a log of vital signs readings may be accessed), and/or from other resources within the security zone (e.g., computing devices and/or applications that already have secure access to medical resources within or outside the security zone).

Thus, techniques described herein avoid the privacy and security concerns that may be raised by allowing general-purpose online semantic processors access to potentially private and/or sensitive information. Instead, the online semantic processors are leveraged to generate locally-implementable state machines that can safely access private information without exposing the private information to the cloud. This simplifies security configuration and reduces network traffic between computing device(s) within the security zone and computing device(s) outside of the security zone.

Also, components such as online semantic processors which handle the conversational aspects of a human-to-computer dialog (i.e. query parsing, resolving intent of the user, keeping track of conversational history for contextual questions, etc.) get limited or no access to sensitive data. Instead, all of the responses are compiled within a security zone, e.g., even on the user's client device. This also alleviates the need for automated assistants—particularly their cloud-based components—to know much, if anything, about users' identities, as the users' identities may be used within the security zone, after the online semantic processor has already fulfilled its task of generating a locally-implementable state machine. This also simplifies authorization and/or authentication, particularly in sensitive environments, because automated assistants do not need to deal with the complexities inherent in access control lists, etc.

Another technical advantage of techniques described herein is that they reduce or even eliminate the need for direct integration between automated assistant backend systems (e.g., cloud-based automated assistant components, which may form online semantic processors) and systems storing potentially sensitive data. Yet another technical advantage is that latency may be improved. For example, sensitive data in many cases may be stored relatively close to the user's client device, including within its local memory. Rather than having a remote online semantic processor attempt to retrieve this data, the retrieval may be left to one or more computing devices within the security zone, which in many cases will be closer (e.g., in network hops) to the desired data. Yet another technical advantage is that techniques described herein facilitate simplified auditing. Rather than an automated assistant fetching data in a relatively ad hoc manner from multiple different sources, the fetched data may be evident from the state machine data provided by the online semantic processor.

In some implementations, a method performed by one or more processors is provided that includes: receiving, at an automated assistant client implemented by one or more of the processors within the security zone, a free form natural language query from a user, wherein the free form natural language query is answerable based on private information that is available from one or more resources within the security zone; providing first data indicative of the free form natural language input to a semantic processor, wherein the semantic processor is outside of the security zone; receiving, by one or more of the processors within the security zone, from the online semantic processor, second data indicative of a state machine, wherein the state machine is implementable to obtain the private information from one or more of the resources within the security zone; implementing, by one or more of the processors within the security zone, the state machine to obtain the private information from one or more of the resources within the security zone; generating, based on the state machine and the obtained private information, natural language output that conveys information responsive to the free form natural language query; and providing, by the automated assistant client, at one or more output components, the natural language output.

These and other implementations of technology disclosed herein may optionally include one or more of the following features.

In various implementations, the state machine may include instructions that are performable by the automated assistant client. In various implementations, the one or more resources within the security zone may include memory of a computing device that implements the automated assistant client. In various implementations, the state machine may include one or more slots that are to be filled with values that are obtainable from one or more of the resources within the security zone.

In various implementations, implementing the state machine to perform the routine may include implementing an interpreter to execute bytecode forming the state machine. In various implementations, the security zone may include one or more networks that are protected by one or more firewalls. In various implementations, the one or more resources within the security zone may include one or more databases containing medical information about a population of people associated with healthcare provider that manages the security zone.

In addition, some implementations include one or more processors of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
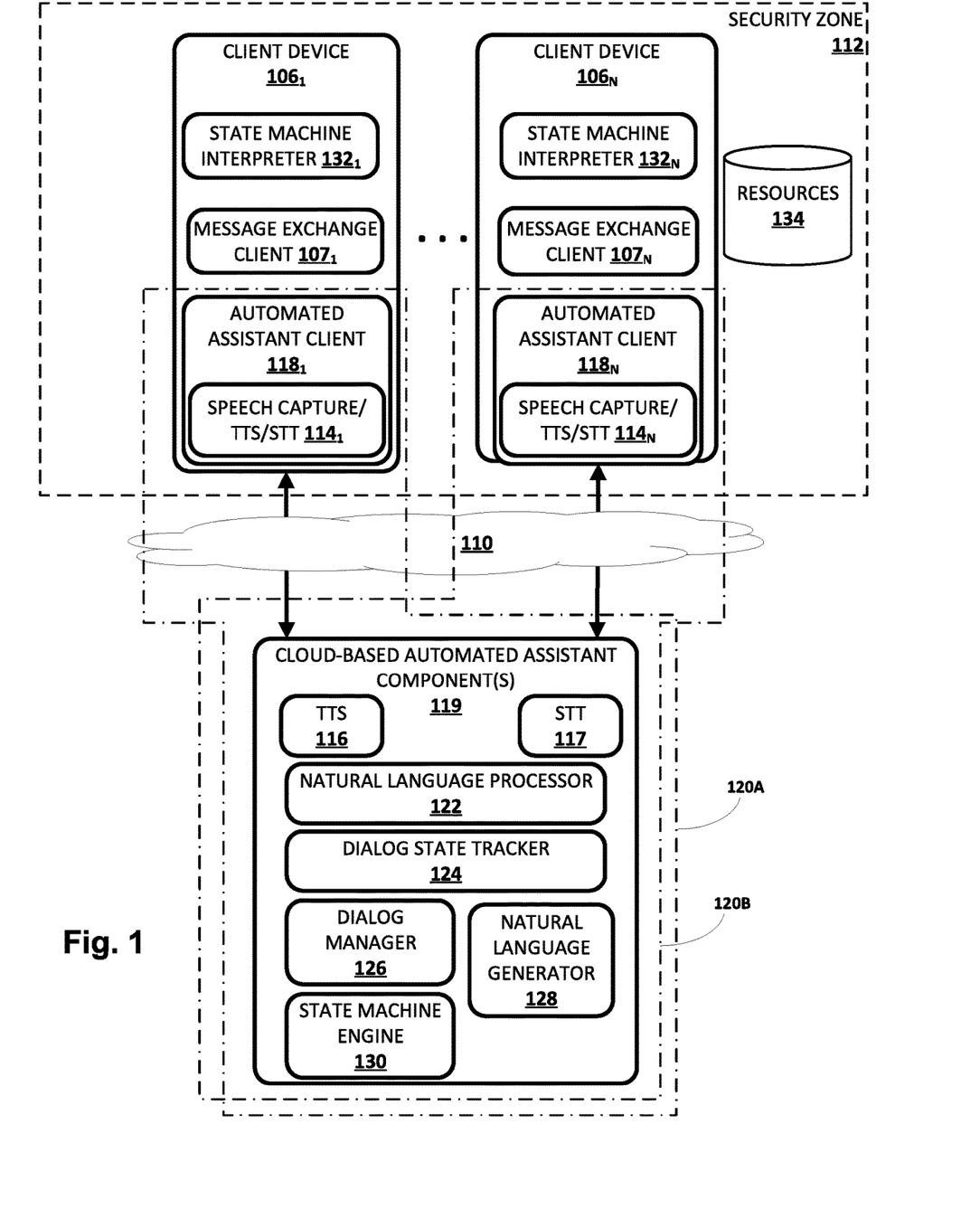
FIG. 1 is a block diagram of an example environment in which implementations disclosed herein may be implemented.

Now turning to FIG. 1, an example environment in which techniques disclosed herein may be implemented is illustrated. The example environment includes one or more client computing devices $106_{1-N}$. Each client device 106 may execute a respective instance of an automated assistant client 118. One or more cloud-based automated assistant components 119, such as a natural language processor 122, may be implemented on one or more computing systems (collectively referred to as a "cloud" computing system) that are communicatively coupled to client devices $106_{1-N}$ via one or more local and/or wide area networks (e.g., the Internet) indicated generally at 110.

In various implementations, an instance of an automated assistant client 118, by way of its interactions with one or more cloud-based automated assistant components 119, may form what from the user's perspective appears to be a logical instance of an automated assistant 120. The user may engage with this logical instance of an automated assistant 120 in human-to-computer dialog(s). Two instances of such an automated assistant 120 are depicted in FIG. 1. A first automated assistant 120A encompassed by a dash-dot-dashed line serves a first user (not depicted) operating first client device $106_1$ and includes automated assistant client 1181 and one or more cloud-based automated assistant components 119. A second automated assistant 120B encompassed by a dash-dash-dot line serves a second user (not depicted) operating another client device $106_N$ and includes automated assistant client $118_N$ and one or more cloud-based automated assistant components 119. It thus should be understood that in some implementations, each user that engages with an automated assistant client 118 executing on a client device 106 may, in effect, engage with his or her own logical instance of an automated assistant 120. For the sakes of brevity and simplicity, the term "automated assistant" as used herein as "serving" a particular user will refer to the combination of an automated assistant client 118 executing on a client device 106 operated by the user and one or more cloud-based automated assistant components 119 (which may be shared amongst multiple automated assistant clients 118). It should also be understood that in some implementations, automated assistant 120 may respond to a request from any user regardless of whether the user is actually "served" by that particular instance of automated assistant 120.

The client devices $106_{1-N}$ may include, for example, one or more of: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a stand-alone interactive speaker, a smart appliance such as a smart television, and/or a wearable apparatus of the user that includes a computing device (e.g., a watch of the user having a computing device, glasses of the user having a computing device, a virtual or augmented reality computing device). Additional and/or alternative client computing devices may be provided.

In various implementations, each of the client computing devices $106_{1-N}$ may operate a variety of different applications, such as a corresponding one of a plurality of message exchange clients $107_{1-N}$. Message exchange clients $107_{1-N}$ may come in various forms and the forms may vary across the client computing devices $106_{1-N}$ and/or multiple forms may be operated on a single one of the client computing devices $106_{1-N}$. In some implementations, one or more of the message exchange clients $107_{1-N}$ may come in the form of a short messaging service ("SMS") and/or multimedia messaging service ("MMS") client, an online chat client (e.g., instant messenger, Internet relay chat, or "IRC," etc.), a messaging application associated with a social network, a personal assistant messaging service dedicated to conversations with automated assistant 120, and so forth. In some implementations, one or more of the message exchange clients $107_{1-N}$ may be implemented via a webpage or other resources rendered by a web browser (not depicted) or other application of client computing device 106.

As described in more detail herein, automated assistant 120 engages in human-to-computer dialog sessions with one or more users via user interface input and output devices of one or more client devices $106_{1-N}$. In some implementations, automated assistant 120 may engage in a human-to-computer dialog session with a user in response to user interface input provided by the user via one or more user interface input devices of one of the client devices $106_{1-N}$. In some of those implementations, the user interface input is explicitly directed to automated assistant 120. For example, one of the message exchange clients $107_{1-N}$ may be a personal assistant messaging service dedicated to conversations with automated assistant 120 and user interface input provided via that personal assistant messaging service may be automatically provided to automated assistant 120. Also, for example, the user interface input may be explicitly directed to automated assistant 120 in one or more of the message exchange clients $107_{1-N}$ based on particular user interface input that indicates automated assistant 120 is to be invoked. For instance, the particular user interface input may be one or more typed characters (e.g., @AutomatedAssistant), user interaction with a hardware button and/or virtual button (e.g., a tap, a long tap), an oral command (e.g., "Hey Automated Assistant"), and/or other particular user interface input.

In some implementations, automated assistant 120 may engage in a dialog session in response to user interface input, even when that user interface input is not explicitly directed to automated assistant 120. For example, automated assistant 120 may examine the contents of user interface input and engage in a dialog session in response to certain terms being present in the user interface input and/or based on other cues. In some implementations, automated assistant 120 may engage interactive voice response ("IVR"), such that the user can utter commands, searches, etc., and the automated assistant may utilize natural language processing and/or one or more grammars to convert the utterances into text, and respond to the text accordingly. In some implementations, the automated assistant 120 can additionally or alternatively respond to utterances without converting the utterances into text. For example, the automated assistant 120 can convert voice input into an embedding, into entity representation(s) (that indicate entity/entities present in the voice input), and/or other "non-textual" representation and operate on such non-textual representation. Accordingly, implementations described herein as operating based on text converted from voice input may additionally and/or alternatively operate on the voice input directly and/or other non-textual representations of the voice input.

Each of the client computing devices $106_{1-N}$ and computing device(s) operating cloud-based automated assistant components 119 may include one or more memories for storage of data and software applications, one or more processors for accessing data and executing applications, and other components that facilitate communication over a network. The operations performed by one or more of the client computing devices $106_{1-N}$ and/or by automated assistant 120 may be distributed across multiple computer systems. Automated assistant 120 may be implemented as, for example, computer programs running on one or more computers in one or more locations that are coupled to each other through a network.

As noted above, in various implementations, each of the client computing devices $106_{1-N}$ may operate an automated assistant client 118. In various implementations, each automated assistant client 118 may include a corresponding speech capture/text-to-speech ("TTS")/speech-to-text ("STT") module 114. In other implementations, one or more aspects of speech capture/TTS/STT module 114 may be implemented separately from automated assistant client 118.

Each speech capture/TTS/STT module 114 may be configured to perform one or more functions: capture a user's speech, e.g., via a microphone (which in some cases may comprise presence sensor 105); convert that captured audio to text (and/or to other representations or embeddings); and/or convert text to speech. For example, in some implementations, because a client device 106 may be relatively constrained in terms of computing resources (e.g., processor cycles, memory, battery, etc.), the speech capture/TTS/STT module 114 that is local to each client device 106 may be configured to convert a finite number of different spoken phrases—particularly phrases that invoke automated assistant 120—to text (or to other forms, such as lower dimensionality embeddings). Other speech input may be sent to cloud-based automated assistant components 119, which may include a cloud-based TTS module 116 and/or a cloud-based STT module 117.

Cloud-based STT module 117 may be configured to leverage the virtually limitless resources of the cloud to convert audio data captured by speech capture/TTS/STT module 114 into text (which may then be provided to natural language processor 122). Cloud-based TTS module 116 may be configured to leverage the virtually limitless resources of the cloud to convert textual data (e.g., natural language responses formulated by automated assistant 120) into computer-generated speech output. In some implementations, TTS module 116 may provide the computer-generated speech output to client device 106 to be output directly, e.g., using one or more speakers. In other implementations, textual data (e.g., natural language responses) generated by automated assistant 120 may be provided to speech capture/TTS/STT module 114, which may then convert the textual data into computer-generated speech that is output locally.

Automated assistant 120 (and in particular, cloud-based automated assistant components 119) may include a natural language processor 122, the aforementioned TTS module 116, the aforementioned STT module 117, a dialog state tracker 124, a dialog manager 126, and a natural language generator 128 (which in some implementations may be combined with TTS module 116), and of particular relevance to the present disclosure, a state machine engine 130. In some implementations, one or more of the engines and/or modules of automated assistant 120 may be omitted, combined, and/or implemented in a component that is separate from automated assistant 120.

In some implementations, automated assistant 120 generates responsive content in response to various inputs generated by a user of one of the client devices $106_{1-N}$ during a human-to-computer dialog session with automated assistant 120. Automated assistant 120 may provide the responsive content (e.g., over one or more networks when separate from a client device of a user) for presentation to the user as part of the dialog session. For example, automated assistant 120 may generate responsive content in response to free form natural language input provided via one of the client devices $106_{1-N}$. As used herein, free form input is input that is formulated by a user and that is not constrained to a group of options presented for selection by the user.

As used herein, a "dialog session" may include a logically-self-contained exchange of one or more messages between a user and automated assistant 120 (and in some cases, other human participants) and/or performance of one or more responsive actions by automated assistant 120. Automated assistant 120 may differentiate between multiple dialog sessions with a user based on various signals, such as passage of time between sessions, change of user context (e.g., location, before/during/after a scheduled meeting, etc.) between sessions, detection of one or more intervening interactions between the user and a client device other than dialog between the user and the automated assistant (e.g., the user switches applications for a while, the user walks away from then later returns to a standalone voice-activated product), locking/sleeping of the client device between sessions, change of client devices used to interface with one or more instances of automated assistant 120, and so forth.

Natural language processor 122 (alternatively referred to as a "natural language understanding engine") of automated assistant 120 processes free form natural language input generated by users via client devices $106_{1-N}$ and in some implementations may generate annotated output for use by one or more other components of automated assistant 120. For example, the natural language processor 122 may process natural language free form input that is generated by a user via one or more user interface input devices of client device $106_1$. The generated annotated output may include one or more annotations of the natural language input and optionally one or more (e.g., all) of the terms of the natural language input.

In some implementations, the natural language processor 122 is configured to identify and annotate various types of grammatical information in natural language input. For example, the natural language processor 122 may include a part of speech tagger (not depicted) configured to annotate terms with their grammatical roles. For example, the part of speech tagger may tag each term with its part of speech such as "noun," "verb," "adjective," "pronoun," etc. Also, for example, in some implementations the natural language processor 122 may additionally and/or alternatively include a dependency parser (not depicted) configured to determine syntactic relationships between terms in natural language input. For example, the dependency parser may determine which terms modify other terms, subjects and verbs of sentences, and so forth (e.g., a parse tree)—and may make annotations of such dependencies.

In some implementations, the natural language processor 122 may additionally and/or alternatively include an entity tagger (not depicted) configured to annotate entity references in one or more segments such as references to people (including, for instance, literary characters, celebrities, public figures, etc.), organizations, locations (real and imaginary), and so forth. In some implementations, data about entities may be stored in one or more databases, such as in a knowledge graph (not depicted). In some implementations, the knowledge graph may include nodes that represent known entities (and in some cases, entity attributes), as well as edges that connect the nodes and represent relationships between the entities. For example, a "banana" node may be connected (e.g., as a child) to a "fruit" node," which in turn may be connected (e.g., as a child) to "produce" and/or "food" nodes. As another example, a restaurant called "Hypothetical Café" may be represented by a node that also includes attributes such as its address, type of food served, hours, contact information, etc. The "Hypothetical Café" node may in some implementations be connected by an edge (e.g., representing a child-to-parent relationship) to one or more other nodes, such as a "restaurant" node, a "business" node, a node representing a city and/or state in which the restaurant is located, and so forth.

The entity tagger of the natural language processor 122 may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity.

In some implementations, the natural language processor 122 may additionally and/or alternatively include a coreference resolver (not depicted) configured to group, or "cluster," references to the same entity based on one or more contextual cues. For example, the coreference resolver may be utilized to resolve the term "there" to "Hypothetical Café" in the natural language input "I liked Hypothetical Café last time we ate there."

In some implementations, one or more components of the natural language processor 122 may rely on annotations from one or more other components of the natural language processor 122. For example, in some implementations the named entity tagger may rely on annotations from the coreference resolver and/or dependency parser in annotating all mentions to a particular entity. Also, for example, in some implementations the coreference resolver may rely on annotations from the dependency parser in clustering references to the same entity. In some implementations, in processing a particular natural language input, one or more components of the natural language processor 122 may use related prior input and/or other related data outside of the particular natural language input to determine one or more annotations.

In some implementations, dialog state tracker 124 may be configured to keep track of a "dialog state" that includes, for instance, a belief state of a one or more users' goals (or "intents") over the course of a human-to-computer dialog session, across multiple dialog sessions, and/or during a conference dialog session. In determining a dialog state, some dialog state trackers may seek to determine, based on user and system utterances in a dialog session, the most likely value(s) for slot(s) that are instantiated in the dialog. Some techniques utilize a fixed ontology that defines a set of slots and the set of values associated with those slots. Some techniques additionally or alternatively may be tailored to individual slots and/or domains. For example, some techniques may require training a model for each slot type in each domain.

Dialog manager 126 may be configured to map a current dialog state, e.g., provided by dialog state tracker 124, to one or more "responsive actions" of a plurality of candidate responsive actions that are then performed by automated assistant 120. Responsive actions may come in a variety of forms, depending on the current dialog state. For example, initial and midstream dialog states that correspond to turns of a dialog session that occur prior to a last turn (e.g., when the ultimate user-desired task is performed) may be mapped to various responsive actions that include automated assistant 120 outputting additional natural language dialog. This responsive dialog may include, for instance, requests that the user provide parameters for some action (i.e., fill slots) that dialog state tracker 124 believes the user intends to perform. In some implementations, responsive actions may include actions such as "request" (e.g., seek parameters for slot filling), "offer" (e.g., suggest an action or course of action for the user), "select," "inform" (e.g., provide the user with requested information), "no match" (e.g., notify the user that the user's last input is not understood), and so forth.

In FIG. 1, client devices $106_{1-N}$ are contained within what will be referred to herein as a "security zone" 112. Security zone 112 may include one or more client devices 106 and/or other computing resources (e.g., resource(s) 134 described below) to which access is somehow protected by or limited to (e.g., controlled by) one or more people. In some implementations, security zone 112 may take the form of one or more interconnected local area networks ("LANs") that are connected to one or more wide area networks ("WANs") such as the Internet via one or more routers and/or firewalls. For example, many organizations such as businesses and corporations have corporate networks that are protected from the outside computing world from one or more security mechanisms, such as one or more firewalls.

However, security zone 112 is not limited to corporate networks. For example, individual households may have Internet access through one or more routers, and those routers or separate devices may also provide, for instance, a Wi-Fi LAN that effectively defines a security zone. Additionally or alternatively, security zone 112 may include one or more client devices 106 that form part of a coordinated "ecosystem" of client devices that are operated by one or more people, such as an individual, a family, co-workers, a department, etc. In some implementations, security zone 112 may have multiple sub-security zones, such as one or more networks dedicated to accounting, one or more networks dedicated to human resources, one or more networks dedicated to research and development ("R&D"), etc. In some such implementations, these sub-security zones may be protected from each other, e.g., so that accounting personnel cannot access R&D computing resources, and/or vice versa. In the healthcare context, security zone 112 may include one or more computing devices and/or computing resources (e.g., 134) that include healthcare-related information, such as patient data that might be protected by, for instance, the Health Insurance Portability and Accountability Act ("HIPAA").

Resource(s) 134 may include one or more databases or other similar data sources that include information that is available (e.g., accessible) within security zone 112, but not generally available to computing devices that are outside of security zone 112. In FIG. 1, resource(s) 134 is depicted as a single database that is separate from client devices 106, but this is not meant to be limiting. In some implementations, such as in the context of an individual user, there may be no separate resource. Instead, all protected data may be contained on a client device 106 that is controlled by the user, and as such, the protected data may not be readily accessible from outside of the user's client device 106.

Additionally or alternatively, in some implementations, sensitive or secure information may be stored outside of security zone 112, but may be accessible from one or more client devices 106 within security zone 112. For example, one or more client devices 106 may be configured to establish/maintain a virtual private network ("VPN") with one or more computing resources outside of security zone 112 that contain sensitive data. Even though the sensitive data is not stored on a computing device within security zone 112, that sensitive data nevertheless may not be readily accessible from outside of security zone 112, e.g., at all or at least without some credential(s). Accordingly, techniques described herein may facilitate a computing resource within security zone 112 accessing sensitive information from one or more resources outside of security zone 112.

When a user engages automated assistant 120 seeking non-confidential information, obtaining responsive information may be straightforward. An "online semantic processor," which may include one or more cloud-based automated assistant components 119, may syntactically and/or semantically process the user's request to determine the user's intent, as well as determine any slots that should be filled in order to fulfill the user's request. For example, suppose the user asks, "Will it be hotter tomorrow that it is today?" This weather-related request seeks non-sensitive, publicly-available information. The online semantic processor may process the user's request to determine the user's intent (e.g., outside temperature comparison) and slot values to be used for the comparison: "today" and "tomorrow." The online semantic processor may formulate one or more search queries that seek today's temperature (e.g., a high temperature) and tomorrow's predicted temperature, and may submit those search queries to one or more general purpose search engines, weather-based search engines, etc. Upon receiving responsive information, the online semantic processor (e.g., with assistance from a component such as natural language generator 128) may formulate a natural language response such as, "It will be hotter tomorrow than today, 28 degrees Celsius rather than 25 degrees Celsius." This natural language response may then be output at one or more output devices (e.g., speakers) of one or more client devices 106.

By contrast, when a user engages automated assistant 120 for confidential, secret, sensitive, or otherwise sensitive information, or even for information that's simply not readily available from a computing resource outside security zone 112 (and hence, not available to, for instance, general purpose search engines), automated assistant 120 may be unable to formulate a response. Techniques described herein seek to address this situation.

In various implementations, cloud-based automated assistant components 119 may include the aforementioned state machine engine 130, which may be configured to generate and/or provide state machines that are executable within security zone 112, e.g., by automated assistant clients 118 and/or "state machine interpreters" 132 operating on client devices 106 within security zone 112, to obtain private information (e.g., secret information, sensitive data, data that is only available from within security zone 112) from one or more resources within the security zone. As used herein, a "resource" within security zone 112 may refer to any computing device within security zone, such as a client device 106 operated by a user, a server, a database (e.g., 134), etc.

A "state machine" may refer to data indicative of any routine that is implementable by a computing device to perform some action. State machines may be distributed in accordance with techniques described herein in various forms. In some implementations, state machines may be distributed in files written using markup languages such as the extensible markup language ("XML"), state chart XML ("SCXML"), hypertext markup language ("HTML"), unified modeling language ("UML"), specification and description language ("SDL"), etc. Additionally or alternatively, in some implementations, state machines may be distributed as instructions that are executable by interpreter software (e.g., state machine interpreter 132), e.g., using "just in time" compilation and/or interpretation. For example, in some implementations, state machine interpreter 132 may be an instance of the Java virtual machine (or another virtual machine) and state machines may be distributed to, and implemented by state machine interpreter 132 in the form of bytecode. Additionally or alternatively, in some implementations, state machines may be distributed as compiled machine code, un-compiled source code (that may be compiled within security zone 112), assembly code, etc.

State machine engine 130 may generate/select state machines in various scenarios, including scenarios in which a user has provided automated assistant 120 with a request for data that is not publicly available, and that instead may only be available from/through one or more resources within security zone 112. In various implementations, automated assistant client 118 may receive a free form natural language query from a user. The free form natural language query may be answerable based on private information that is available from/through one or more resources within security zone 112, and may not be (e.g., readily) accessible from any computing resources outside of security zone 112.

In various implementations, first data indicative of the free form natural language input may be provided to an online semantic processor outside of security zone 112, such as one or more cloud-based automated assistant components 119. The semantic processor, e.g., by way of state machine engine 130, may then generate/retrieve data indicative of a state machine ("state machine data") and provide the state machine data to one or more resources within security zone 112. As mentioned previously, the state machine may be executable to obtain the private information sought by the user from one or more resources within security zone 112. One non-limiting example of state machine data will be discussed below.

One or more computing devices within security zone 112, such as a client device 106 or another computing device (e.g., a local server), may implement the state machine received from state machine engine 130 to obtain the private information requested by the user from one or more of the resources within security zone 112. In some implementations, the state machine may be implemented by state machine interpreter 132 operating on the same client device 106 that the user operates to engage with automated assistant 120, although this is not required.

Whichever computing resource within security zone 112 implements the state machine, implementation of the state machine may enable the computing resource to obtain the private data. For example, suppose the private data is available in memory of a client device $106_1$ operated by the user to engage with automated assistant 120. In some such implementations, the local instance of state machine interpreter $132_1$ may execute the state machine to access the local memory and obtain the private data. Additionally or alternatively, suppose the private data is available on a different computing resource (e.g., 134) within security zone. The local instance of state machine interpreter 1321 or another instance executing elsewhere within security zone 112 may retrieve the private data from the different computing resource. Additionally or alternatively, suppose the private data is available outside of security zone 112 to a computing resource within security zone 112 (e.g., via a VPN connection or another previously-authenticated communication channel). The local instance of state machine interpreter 1321 or another instance executing elsewhere within security zone 112 may retrieve the private data from the outside resource using the previously-authenticated communication channel.

Once the private data is retrieved, in some implementations, the state machine may dictate that some action be taken with the data. For example, suppose a user asks, "Has my blood pressure decreased or increased over the last six months?" The last six months of the user's blood pressure data—which may be private data residing, for instance, in memory of client device $106_1$—may be retrieved. Then, logic baked into the state machine by state machine engine 130, such as if/else statements, conditional statements, switch statements, loops, etc., may be implemented, e.g., by state machine interpreter 132 using the retrieve private data as slot values, to generate natural language output. This natural language output may convey information responsive to the user's original free form natural language query. In the blood pressure example, the natural language output could be "Your blood pressure has increased," or "Your blood pressure has decreased," or even "Your blood pressure has remained steady."

Figure 2:
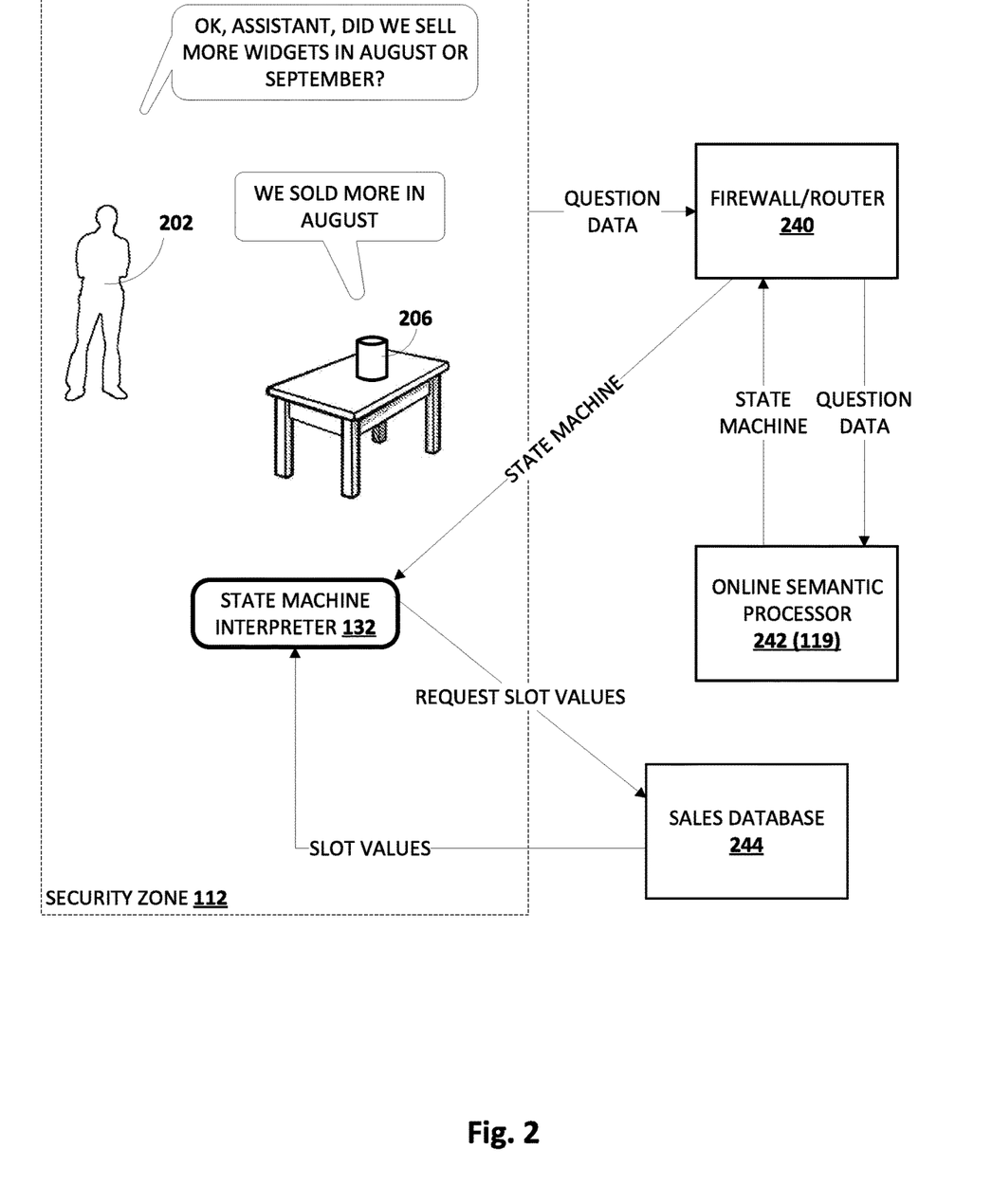
FIG. 2 depicts one example of how techniques described herein may be employed across various components, in accordance with various implementations.

FIG. 2 depicts an example scenario in which a user 202 engages with automated assistant 120 (not depicted in FIG. 2) that executes at least in part on a client device 206 taking the form of a standalone interactive speaker. In this example, a security zone 112 exists that includes client device 206. As noted above, security zone 112 may be one or more corporate networks, e.g., behind one or more firewalls, or may simply be limited to one or more client devices (including 206) of a coordinate ecosystem of client devices operated by user 202.

In FIG. 2, user 202 asks the question, "OK, Assistant, did we sell more widgets in August or September?" Automated assistant 120 may provide, e.g., by way of a firewall and/or router 240, "question data" to an online semantic processor 242, which as noted above may include one or more cloud-based automated assistant components 119. In other implementations this question data may simply be data containing a recording of the user's utterance. In some implementations this question data may include a reduced dimensionality embedding of the user's utterance, and/or an annotated version of the user's utterance.

Whichever the case, firewall/router 240 may forward the question data to online semantic processor 242. Online semantic processor 242, e.g., by way of state machine engine 130 (not depicted in FIG. 2), may generate/select and provide, to firewall/router 240, data indicative of a state machine. This state machine data may then be provided, e.g., by firewall/router 240, to a computing resource executing a state machine interpreter 132 security zone 112. In some implementations state machine interpreter 132 may be operating on client device 206, although this is not required.

State machine interpreter 132 may implement the state machine (e.g., as a virtual machine executing bytecode) to retrieve the private data from one or more resources within security zone 112. For example, state machine interpreter 132 may be implemented on a computing device (e.g., client device 206) that has pre-authenticated access to a sales database 244, e.g., by way of a pre-authenticated communication channel such as a VPN. By contrast, online semantic processor 242 and/or search engines available to online semantic processor 242 may not have access to sales database 244. In such an example, state machine interpreter 132 may request slot values from sales database 244, e.g., using the pre-authenticated communication channel, and sales database 244 may return the requested slot values to state machine interpreter 132. State machine interpreter 132 may then use the returned slot values to generate natural language output for presentation to user 202. For example, in FIG. 2, client device 206 provides the audible natural language output, "We sold more in August."

While the private data was ultimately obtained from a resource (sales database 244) outside of security zone 112, the important thing is that state machine interpreter 132, by way of its operating on a computing device within security zone 112, was able to retrieve the data. In other implementations, the private data may be available from within security zone 112. For example, if security zone 112 represents a healthcare entity's internal network, then a user request to an automated assistant 120 for private healthcare data may be fulfilled from one or more resources within security zone 112.

Figure 3:
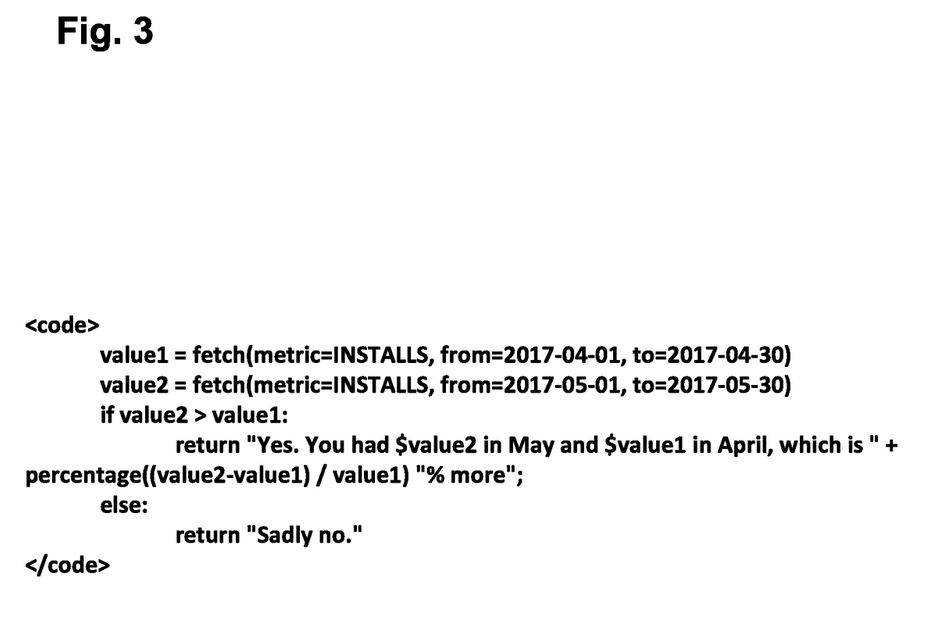
FIG. 3 demonstrates one example of state machine data, in accordance with various implementations.

FIG. 3 depicts one non-limiting example of state machine data that may be generated and/or provided, e.g., by state machine engine 130, in accordance with various implementations. For this example, assume that a user that engages with automated assistant 120 is a developer that wishes to obtain information from, for instance, an online app marketplace on which developer has one or more apps listed for sale. Information about sales or other metrics of the developer's app may only be available to the developer if, for example, the developer logs into an administrative account they have with the online app marketplace. That information may not be otherwise available, at least not publicly. Suppose the developer provides, e.g., to automated assistant 120, the following request: "Did I have more installs in May than in April?"

FIG. 3 depicts one example of state machine data that may be generated, e.g., by state machine engine 130, in response to such a request. In this example, the code is meant to be demonstrative only, and thus is indicated generically as <code> . . . </code>. Two values are (at least implicitly) sought by the developer, installs in April and installs in May. Thus, two slot values, value1 and value2, are being filled. The first slot value, value1, is filled with data that satisfies the parameters METRIC=INSTALLS, from=2017-04-01, and to=2017-04-30 (i.e., number of installs in April of 2017). Likewise, the second slot value, value2, is filled with data that satisfies the parameters METRIC=INSTALLS, from=2017-05-01, and to=2017-05-30 (i.e., number of installs in May of 2017).

The state machine data of FIG. 3 also includes logic in the form of an if/else statement, as well as a mathematical equation that may be used to determine a percentage difference in installs between the two months. This logic may be implementable, e.g., by state machine interpreter 132. In this example, the logic dictates that if value2 is greater than value1 (i.e., more installs in May than April), natural language output may be generated in the form, "Yes. You had $value2 in May and $value1 in April, which is"+percentage ((value2−value1)/value1) "% more." Thus, if there were, say, 150 installs in May and 125 installs in April, then state machine interpreter 132 may generate the following natural language output: "Yes. You had 150 in May and 125 in April, which is 20% more." On the other hand, if value2 is not greater than value1 (e.g., less installs in May then in April), then the natural language output generated by state machine interpreter 132 may simply be "Sadly, no.", or something to that effect.

As noted above, a state machine such as that depicted in FIG. 3 may be generated (e.g., in the cloud) on the fly, e.g., in response to specific free form natural language queries. Additionally or alternatively, in some implementations, state machines may be selected from a library of preexisting state machines. For example, if a user asks, "Do I have diabetes," that query may be mapped to one or more state machines that include slots for data points associated with (i.e. that evidence) diabetes (e.g., glucose levels, H1C levels, BMI, etc.). The state machine may be provided to a component (e.g., 132) within security zone 112 of the requesting user and implemented by that component to obtain one or more of these slot values, either from computing resources within the security zone or from the user (e.g., by prompting the user for the information). As demonstrated in FIG. 3, the state machine may include logic (e.g., if/then statement(s), etc.) that causes output such as "Yes, you likely have diabetes," or "No, you appear healthy" to be provided depending on what values are fetched and used to fill the slots.

In addition to the examples described herein, including those related to healthcare, techniques described herein may be applicable in a wide variety of other contexts. For example, a general purpose online semantic processor and/or a custom online (e.g., intra-corporate-environment) semantic processor may have vast knowledge about specific domains, for instance, accounting standards. Such an online semantic processor may be configured to encode these accounting standards into state machines that are distributed pursuant to techniques described. That way, a user may be able to ask automated assistant 120 a relatively complex accounting question, and the automated assistant 120 may (by way of implementing a state machine provided by the online semantic processor) be able to respond without exposing potentially sensitive data to the online semantic processor.

Figure 4:
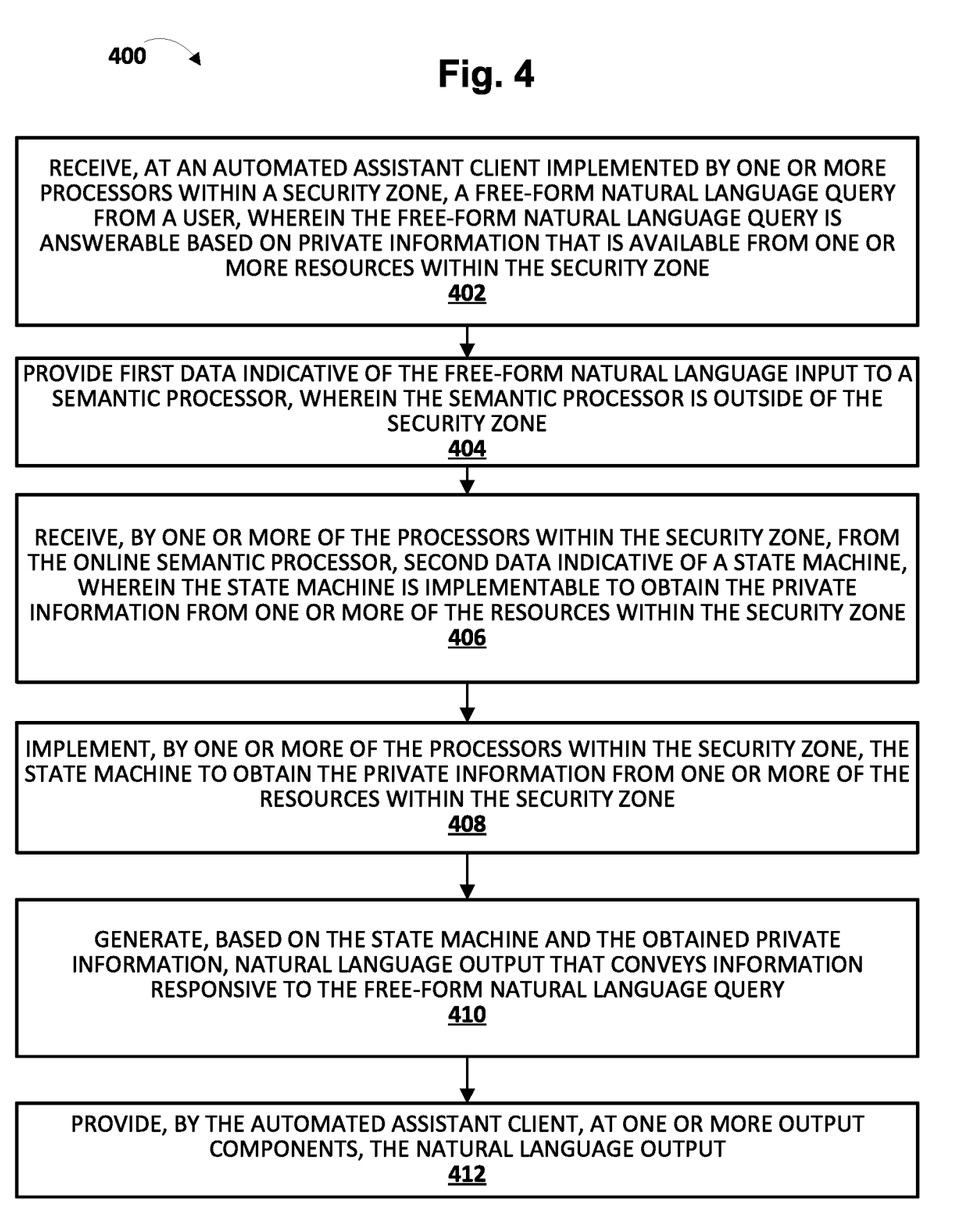
FIG. 4 depicts a flowchart illustrating an example method according to implementations disclosed herein.

FIG. 4 is a flowchart illustrating an example method 400 according to implementations disclosed herein. For convenience, the operations of the flow chart are described with reference to a system that performs the operations. This system may include various components of various computer systems, such as one or more components of computing systems that implement automated assistant 120. Moreover, while operations of method 400 are shown in a particular order, this is not meant to be limiting. One or more operations may be reordered, omitted or added.

At block 402, the system may receive, e.g., at an automated assistant client (118) implemented by one or more processors within a security zone (112), a free form natural language query from a user. The free form natural language query may be answerable based on private information that is available from one or more resources within the security zone. As noted above, the one or more resources within the security need not physically store the private information; in some cases they may simply be preconfigured (e.g., with a pre-authenticated communication channel such as a VPN) to obtain the data from outside of the security zone 112.

At block 404, the system, and in some cases, automated assistant client 118 or another component within the security zone 112, may provide first data indicative of the free form natural language input to a semantic processor, such as one or more cloud-based automated assistant components 119. Notably, the semantic processor may be outside of the security zone, e.g., acting as an online semantic processor. In some implementations, the online semantic processor may retrieve and/or generate a state machine when it is unable to otherwise retrieve requested data.

At block 406, the system may receive, e.g., by way of one or more of the processors within the security zone 112, from the online semantic processor, second data indicative of a state machine (also referred to herein as "state machine data"). The state machine may be implementable, e.g., by state machine interpreter 132, automated assistant client 118, a local virtual machine, etc., to obtain the private information from one or more of the resources within the security zone.

At block 408, the system may, e.g., by way of state machine interpreter 132 and/or automated assistant client 118, implement the state machine to obtain the private information from one or more of the resources within the security zone. In some implementations, implementing the state machine may also include executing various logic that may be contained within the state machine, e.g., using the retrieved private information. For example, state machines may include standard logic such as if/else statements, loops (including recursive loops), jump statements, for else statements, etc. These logic may be implemented using the retrieved private information as slot values.

At block 410, the system (e.g., by way of state machine interpreter 132 and/or automated assistant client 118) may generate, e.g., based on the state machine and the obtained private information, natural language output that conveys information responsive to the free form natural language query. At block 412, the system may provide, by way of automated assistant client 118, at one or more output components, the natural language output generated at block 412. For example, state machine interpreter 132 and/or automated assistant client 118 may cause output to be provided using an output modality that matches the input modality the user used to provide the free form natural language input. If the user provided spoken input, then audible output may be provided. If the user provided typed input, then visual textual output may be provided (although audible output could be provided as well).

Figure 5:
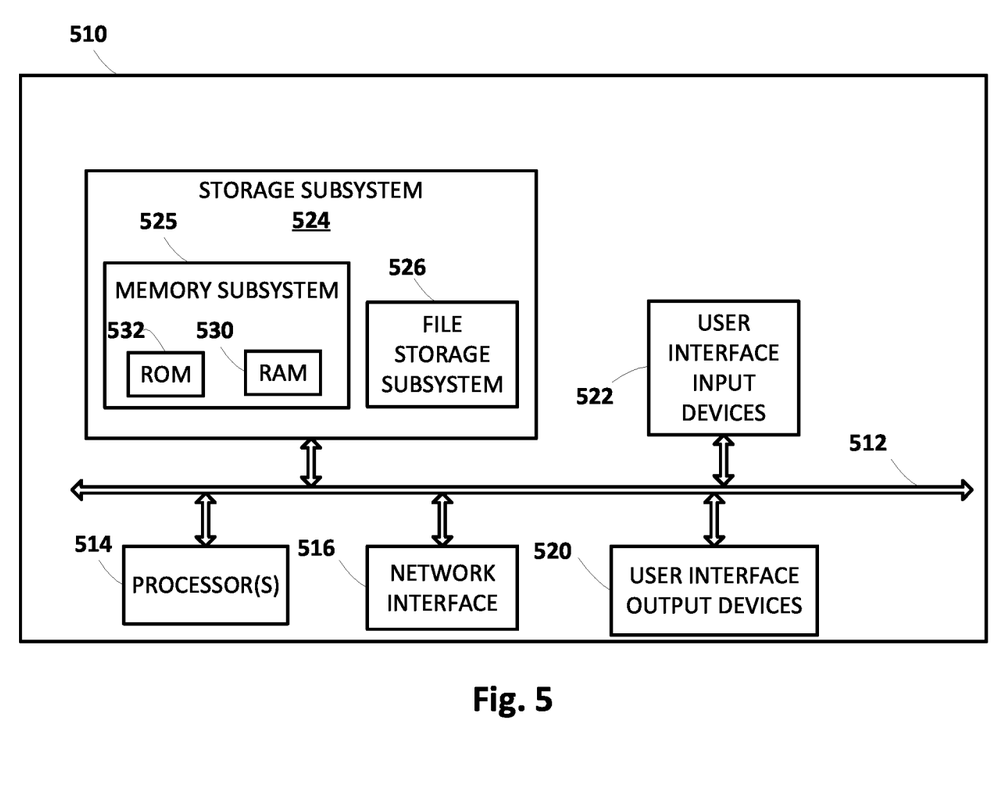
FIG. 5 illustrates an example architecture of a computing device.

FIG. 5 is a block diagram of an example computing device 510 that may optionally be utilized to perform one or more aspects of techniques described herein. Computing device 510 typically includes at least one processor 514 which communicates with a number of peripheral devices via bus subsystem 512. These peripheral devices may include a storage subsystem 524, including, for example, a memory subsystem 525 and a file storage subsystem 526, user interface output devices 520, user interface input devices 522, and a network interface subsystem 516. The input and output devices allow user interaction with computing device 510. Network interface subsystem 516 provides an interface to outside networks and is coupled to corresponding interface devices in other computing devices.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 510 to the user or to another machine or computing device.

Storage subsystem 524 stores programming and data constructs that provide the functionality of some or all of the modules described herein. For example, the storage subsystem 524 may include the logic to perform selected aspects of the method of FIG. 4, as well as to implement various components depicted in FIG. 1.

These software modules are generally executed by processor 514 alone or in combination with other processors. Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computing device 510 communicate with each other as intended. Although bus subsystem 512 is shown schematically as a single bus, alternative implementations of the bus subsystem may use multiple busses.

Computing device 510 can be of varying types including a workstation, server, computing cluster, blade server, server farm, or any other data processing system or computing device. Due to the ever-changing nature of computers and networks, the description of computing device 510 depicted in FIG. 5 is intended only as a specific example for purposes of illustrating some implementations. Many other configurations of computing device 510 are possible having more or fewer components than the computing device depicted in FIG. 5.

In situations in which certain implementations discussed herein may collect or use personal information about users (e.g., user data extracted from other electronic communications, information about a user's social network, a user's location, a user's time, a user's biometric information, and a user's activities and demographic information, relationships between users, etc.), users are provided with one or more opportunities to control whether information is collected, whether the personal information is stored, whether the personal information is used, and how the information is collected about the user, stored and used. That is, the systems and methods discussed herein collect, store and/or use user personal information only upon receiving explicit authorization from the relevant users to do so.

For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors within a security zone, comprising:
   receiving, at an automated assistant client implemented by one or more of the processors of a client device within the security zone, a free form natural language query from a user, wherein the free form natural language query is answerable based on private information that is available from one or more resources within the security zone, wherein the security zone comprises a coordinated ecosystem of computing devices that are associated with a user profile of the user and that includes the client device, and wherein one or more of the resources is hosted by a different computing device of the ecosystem;
   providing first data indicative of the free form natural language query to a semantic processor, wherein the semantic processor is outside of the security zone and cannot directly access the one or more resources within the security zone;
   receiving, at one or more of the processors within the security zone, from the semantic processor, second data indicative of a state machine, wherein the state machine is implementable to obtain the private information from one or more of the resources within the security zone;
   implementing, by one or more of the processors within the security zone, the state machine to obtain the private information from one or more of the resources within the security zone;

generating, based on the state machine and the obtained private information, natural language output that conveys information responsive to the free form natural language query; and providing, by the automated assistant client, at one or more output components, the natural language output.

2. The method of claim 1, wherein the state machine comprises instructions that are performable by the automated assistant client.

3. The method of claim 1, wherein the state machine comprises one or more slots that are to be filled with values that are obtainable from one or more of the resources within the security zone.

4. The method of claim 1, wherein implementing the state machine comprises implementing an interpreter to execute bytecode forming the state machine.

5. The method of claim 1, wherein the one or more resources within the security zone include one or more vital sign sensors.

6. The method of claim 1, wherein the one or more resources within the security zone includes a log of vital signs.

7. The method of claim 1, wherein at least some of the private information is stored in memory that is hosted outside of the security zone, and the one or more resources within the security zone includes a computing device of the ecosystem that executes an application with access to at least a portion of the memory.

8. A system comprising one or more processors within a security zone and memory storing instructions that, in response to execution of the instructions by the one or more processors, cause the one or more processors to:

receive, at an automated assistant client implemented by one or more of the processors of a client device within the security zone, a free form natural language query from a user, wherein the free form natural language query is answerable based on private information that is available from one or more resources within the security zone, wherein the security zone comprises a coordinated ecosystem of computing devices that are associated with a user profile of the user and that includes the client device, and wherein one or more of the resources is hosted by a different computing device of the ecosystem;

provide first data indicative of the free form natural language query to a semantic processor, wherein the semantic processor is outside of the security zone and cannot directly access the one or more resources within the security zone;

receive, at one or more of the processors within the security zone, from the semantic processor, second data indicative of a state machine, wherein the state machine is implementable to obtain the private information from one or more of the resources within the security zone;

implement, by one or more of the processors within the security zone, the state machine to obtain the private information from one or more of the resources within the security zone;

generate, based on the state machine and the obtained private information, natural language output that conveys information responsive to the free form natural language query; and provide, by the automated assistant client, at one or more output components, the natural language output.

9. The system of claim 8, wherein the state machine comprises instructions that are performable by the automated assistant client.

10. The system of claim 8, wherein the state machine comprises one or more slots that are to be filled with values that are obtainable from one or more of the resources within the security zone.

11. The system of claim 8, further comprising instructions to implement an interpreter to execute bytecode forming the state machine.

12. The system of claim 8, wherein the one or more resources within the security zone include one or more vital sign sensors.

13. The system of claim 8, wherein the one or more resources within the security zone includes a log of vital signs.

14. The system of claim 8, wherein at least some of the private information is stored in memory that is hosted outside of the security zone, and the one or more resources within the security zone includes a computing device of the ecosystem that executes an application with access to at least a portion of the memory.

15. At least one non-transitory computer-readable medium comprising instructions that, in response to execution of the instructions by one or more processors within a security zone, cause the one or more processors to perform the following operations:

receiving, at an automated assistant client implemented by one or more of the processors of a client device within the security zone, a free form natural language query from a user, wherein the free form natural language query is answerable based on private information that is available from one or more resources within the security zone, wherein the security zone comprises a coordinated ecosystem of computing devices that are associated with a user profile of the user and that includes the client device, and wherein one or more of the resources is hosted by a different computing device of the ecosystem;

providing first data indicative of the free form natural language query to a semantic processor, wherein the semantic processor is outside of the security zone and cannot directly access the one or more resources within the security zone;

receiving, at one or more of the processors within the security zone, from the semantic processor, second data indicative of a state machine, wherein the state machine is implementable to obtain the private information from one or more of the resources within the security zone;

implementing, by one or more of the processors within the security zone, the state machine to obtain the private information from one or more of the resources within the security zone;

generating, based on the state machine and the obtained private information, natural language output that conveys information responsive to the free form natural language query; and providing, by the automated assistant client, at one or more output components, the natural language output.

16. The at least one non-transitory computer-readable medium of claim 15, wherein the state machine comprises instructions that are performable by the automated assistant client.

17. The at least one non-transitory computer-readable medium of claim 15, wherein the state machine comprises one or more slots that are to be filled with values that are obtainable from one or more of the resources within the security zone.

18. The at least one non-transitory computer-readable medium of claim 15, wherein implementing the state machine comprises implementing an interpreter to execute bytecode forming the state machine.

19. The at least one non-transitory computer-readable medium of claim 15, wherein the one or more resources within the security zone include one or more vital sign sensors.

20. The at least one non-transitory computer-readable medium of claim 15, wherein the one or more resources within the security zone includes a log of vital signs.

* * * * *